United States Patent
Chen et al.

(10) Patent No.: US 10,477,645 B1
(45) Date of Patent: Nov. 12, 2019

(54) DISPLAY APPARATUS AND OPERATING METHOD THEREOF

(71) Applicant: Au Optronics Corporation, Hsinchu (TW)

(72) Inventors: Chun-Yu Chen, Hsinchu (TW); Chun-Kuei Wen, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/182,629

(22) Filed: Nov. 7, 2018

(30) Foreign Application Priority Data

Aug. 22, 2018 (TW) .............................. 107129261 A

(51) Int. Cl.
*H05B 37/02* (2006.01)
*G09G 5/10* (2006.01)

(52) U.S. Cl.
CPC ............ *H05B 37/0218* (2013.01); *G09G 5/10* (2013.01); *G09G 2320/064* (2013.01); *G09G 2360/141* (2013.01); *G09G 2360/145* (2013.01)

(58) Field of Classification Search
CPC .. G09G 3/3233; G09G 3/3258; G09G 3/3291; G09G 3/3611; H05B 37/0227; H05B 37/0245; H05B 37/0281
USPC ......... 345/102, 207, 690; 315/149, 308, 312
See application file for complete search history.

(56) References Cited

U.S. PATENT DOCUMENTS

| | | | |
|---|---|---|---|
| 8,558,782 B2 | 10/2013 | You et al. | |
| 2004/0095402 A1* | 5/2004 | Nakano | G06F 3/0412 346/102 |
| 2008/0157682 A1* | 7/2008 | Kwon | G09G 3/3406 315/154 |
| 2009/0189840 A1* | 7/2009 | Chu | G09G 3/3413 345/89 |
| 2010/0277410 A1 | 11/2010 | You et al. | |
| 2016/0027388 A1* | 1/2016 | Seo | G09G 3/20 345/690 |

FOREIGN PATENT DOCUMENTS

| | | |
|---|---|---|
| CN | 106548755 | 3/2017 |
| CN | 206596262 | 10/2017 |
| CN | 107750073 | 3/2018 |
| TW | I455097 | 10/2014 |

* cited by examiner

*Primary Examiner* — Tung X Le
(74) *Attorney, Agent, or Firm* — JCIPRNET

(57) ABSTRACT

A display apparatus and an operating method of the display apparatus are provided. The display apparatus includes a display panel, a light luminance sensing circuit, a controller, and a driving circuit. The light luminance sensing circuit senses luminance intensity to generate an output sensing signal. The controller receives the output sensing signal and converts the output sensing signal to generate selecting numeric information according to look-up information. The controller generates a control driving signal according to the selecting numeric information. The look-up information records a corresponding relation between a plurality of electric characteristic values and a plurality of pieces of numeric information. The driving circuit adjusts the luminance intensity of a lighting element according to the control driving signal.

11 Claims, 6 Drawing Sheets

DISPLAY APPARATUS AND OPERATING METHOD THEREOF

CROSS REFERENCE TO RELATED APPLICATION

This application claims the priority benefit of Taiwan application serial no. 107129261, filed on Aug. 22, 2018. The entirety of the above-mentioned patent application is hereby incorporated by reference herein and made a part of specification.

BACKGROUND

Technical Field

The invention relates to a display apparatus and an operating method thereof. More particularly, the invention relates a display apparatus and an operating method thereof capable of adjusting luminance intensity of a backlight panel.

Description of Related Art

Nowadays, in display apparatuses, luminance intensity of a backlight panel in a display panel may be adjusted according to modulation of a duty cycle of a control driving signal performed by a customer system. Nevertheless, the luminance intensity of the backlight panel in the display panel is not a fixed value and changes along with the pixel temperature and pixel penetration in the display panel. Further, positive or negative tolerance (e.g., positive and negative tolerance of 15%) of a certain degree is practically allowed in the luminance intensity of the backlight panel. If a fixed duty cycle is merely set, the luminance intensity of the backlight panel affected by the positive and negative tolerance can not be instantaneously calibrated, and thus it is difficult for the luminance intensity of the backlight panel to be maintained at expected target intensity. Therefore, how changes of the luminance intensity of the backlight panel can be instantaneously sensed and the control driving signal is accordingly adjusted according to different luminance intensity of the backlight panel, so as to adjust and maintain the luminance intensity of the backlight panel at expected target intensity is an important issue.

SUMMARY

The invention provides a display apparatus and an operating method thereof capable of instantaneously sensing luminance intensity of a backlight panel and performing automatic adjustment and calibration so that the luminance intensity of the backlight panel is maintained at target intensity.

A display apparatus provided by an embodiment of the invention includes a display panel, a light luminance sensing circuit, a controller, and a driving circuit. The light luminance sensing circuit is disposed on the display panel and senses luminance intensity to generate an output sensing signal. The controller is coupled to the light luminance sensing circuit, receives the output sensing signal, and converts the output sensing signal to generate selecting numeric information according to look-up information. The controller generates a control driving signal according to the selecting numeric information. Herein, the look-up information records a corresponding relation between a plurality of electric characteristic values and a plurality of pieces of numeric information. The driving circuit is coupled to the controller, and the driving circuit adjusts the luminance intensity of a lighting element according to the control driving signal.

An operating method provided by an embodiment of the invention includes the following steps. Luminance intensity is sensed to generate an output sensing signal. The output sensing signal is converted according to the look-up information to generate selecting numeric information, and the control driving signal is generated according to the selecting numeric information. The look-up information records a corresponding relation between a plurality of electric characteristic values and a plurality of pieces of numeric information. Further, a driving circuit is provided to adjust the luminance intensity of a lighting element according to the control driving signal.

To sum up, in the embodiments of the invention, the luminance intensity of the backlight panel in the display panel is instantaneously sensed through the light luminance sensing circuit to generate the output sensing signal. The controller looks up the numeric information corresponding to the output sensing signal according to the look-up information and accordingly generates the selecting numeric information, and the controller generates the control driving signal according to the selecting numeric information, so as to adjust the luminance intensity of the backlight panel through the driving circuit. Therefore, the luminance intensity of the backlight panel is automatically adjusted and is maintained at expected target intensity.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
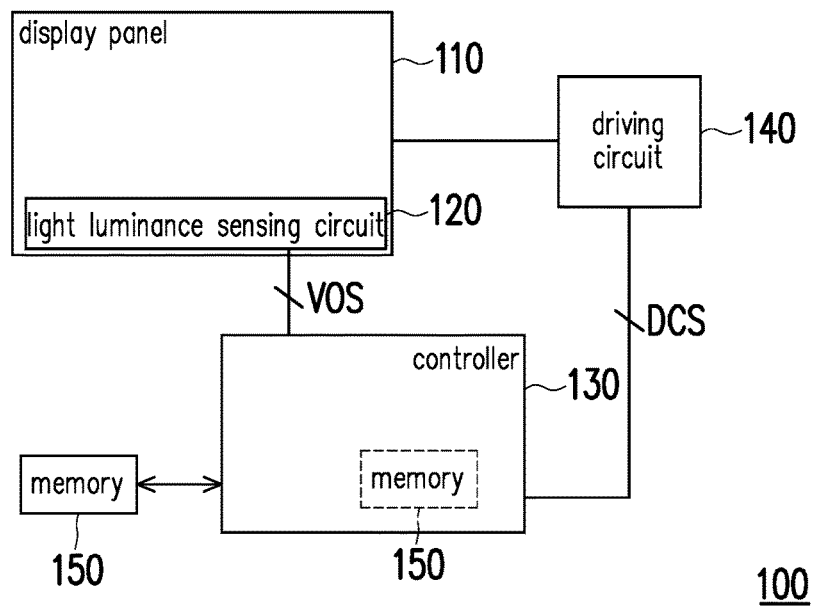
FIG. 1 is a schematic view illustrating a display apparatus according to an embodiment of the invention.

With reference to FIG. 1, FIG. 1 is a schematic view illustrating a display apparatus according to an embodiment of the invention. A display apparatus 100 includes a display panel 110, a light luminance sensing circuit 120, a controller 130, a driving circuit 140, and a memory 150. The light luminance sensing circuit 120 is disposed on the display panel 110, and the light luminance sensing circuit 120 senses luminance intensity of a lighting element of the display panel 110 to generate an output sensing signal VOS. The controller 130 is coupled to the light luminance sensing circuit 120 and configured to receive the output sensing signal VOS and converts the output sensing signal VOS to generate selecting numeric information according to look-up information. Next, the controller 130 generates a control driving signal DCS according to the selecting numeric information. Herein, the look-up information records a corresponding relationship between a plurality of electric characteristic values (e.g., a sensing voltage value or a sensing current value of the output sensing signal VOS) and a plurality of pieces of numeric information. Note that the look-up information of this embodiment is recorded in the memory 150, and the memory 150 may be externally connected to the controller 130 or may be embedded in the controller 130, which is not limited by the invention in this regard.

In addition, it is worth noting that the controller 130 of this embodiment features a timing control function and a gear control function. Specifically, the controller 130 may look up the numeric information corresponding to the sensing voltage value (or the sensing current value) of the output sensing signal VOS sensed by the light luminance sensing circuit 120 according to the look-up information and treat the numeric information as the selecting numeric information to perform gear control. Further, the controller 130 may adjust a timing of the control driving signal DCS through the selecting numeric information to perform timing control. Herein, the control driving signal DCS is, for example, a pulse width modulation signal, but the invention is not limited thereto. The driving circuit 140 is coupled to the controller 130 and adjusts the luminance intensity of the lighting element according to the received control driving signal DCS. In this embodiment, the lighting element is, for example, a backlight panel of the display panel 110, but the invention is not limited thereto.

Figure 2:
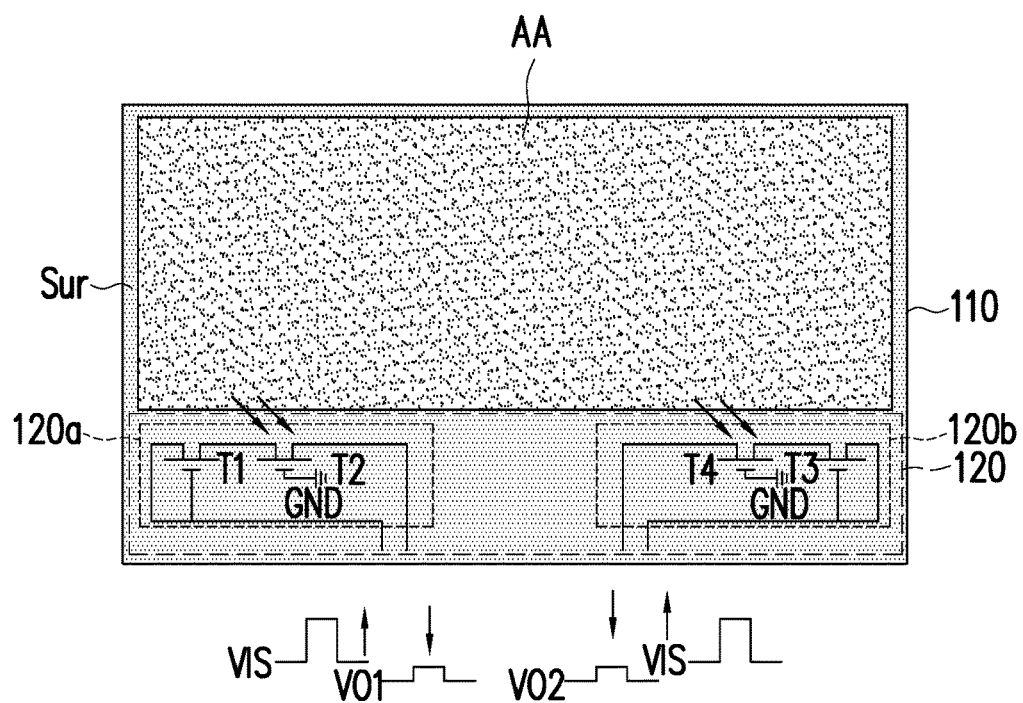
FIG. 2 is a schematic view illustrating the display panel of the display apparatus of FIG. 1 according to an embodiment of the invention.

Specifically, with reference to FIG. 1 and FIG. 2 together, FIG. 2 is a schematic view illustrating the display panel of the display apparatus of FIG. 1 according to an embodiment of the invention. The display panel 110 has an active region AA and a peripheral region Sur, and the light luminance sensing circuit 120 is disposed on the peripheral region Sur of the display panel 110. Herein, the light luminance sensing circuit 120 includes a plurality of luminance sensing modules (e.g., luminance sensing modules 120a and 120b). Note that for ease of description, only two luminance sensing modules 120a and 120b are depicted in FIG. 2 to act as an exemplary example; nevertheless, a number of the luminance sensing modules may practically be two or more than two, which is not limited by the invention in this regard.

In this embodiment, each of the luminance sensing modules 120a and 120b receives an input sensing signal VIS to sense luminance intensity of the backlight panel in the display panel 110 to generate an output sensing sub-signal (e.g., an output sensing sub-signal VO1 and an output sensing sub-signal VO2). Further, the luminance sensing modules 120a and 120b generate the output sensing signal VOS according to the output sensing sub-signals VO1 and VO2. In addition, the input sensing signals VIS of this embodiment are, for example, square-wave signals, but the invention is not limited thereto. Specifically, the luminance sensing module 120a includes a transistor T1 and a light-sensitive transistor T2, and a control terminal of the transistor T1 is coupled to a first terminal of the transistor T1 so that a diode configuration is formed through such coupling manner. An anode of a diode constructed by the transistor T1 receives the input sensing signal VIS, and a cathode of the diode is coupled to a first terminal of the light-sensitive transistor T2. The first terminal of the light-sensitive transistor T2 is coupled to a second terminal of the transistor T1, a control terminal of the light-sensitive transistor T2 is coupled to a grounding voltage GND, and a second terminal of the light-sensitive transistor T2 generates the output sensing sub-signal VO1. A voltage value of the output sensing sub-signal VO1 changes according to the sensed luminance intensity of the backlight panel.

From another perspective, the luminance sensing module 120b includes a transistor T3 and a light-sensitive transistor T4, and a control terminal of the transistor T3 is coupled to a first terminal of the transistor T3 so that a diode configuration is formed through such coupling manner. An anode of a diode constructed by the transistor T3 receives the input sensing signal VIS, and a cathode of the diode is coupled to a first terminal of the light-sensitive transistor T4. The first terminal of the light-sensitive transistor T4 is coupled to a second terminal of the transistor T3, a control terminal of the light-sensitive transistor T4 is coupled to the grounding voltage GND, and a second terminal of the light-sensitive transistor T4 generates the output sensing sub-signal VO2. A voltage value of the output sensing sub-signal VO2 changes according to the sensed luminance intensity of the backlight panel.

Note that the voltage value of the output sensing sub-signal VO1 generated by the luminance sensing module 120a may be identical to or may be different from the voltage value of the output sensing sub-signal VO2 generated by the luminance sensing module 120b. When the voltage value of the output sensing sub-signal VO1 is identical to the voltage value of the output sensing sub-signal VO2, the light luminance sensing circuit 120 treats the voltage value of the output sensing sub-signal VO1 (or the voltage value of the output sensing sub-signal VO2) as the sensing voltage value of the output sensing signal VOS to be outputted to the controller 130. Correspondingly, when the voltage value of the output sensing sub-signal VO1 is different from the voltage value of the output sensing sub-signal VO2, the light luminance sensing circuit 120 obtains a mean of the voltage value of the output sensing sub-signal VO1 and the voltage value of the output sensing sub-signal VO2 and treats the mean as the sensing voltage value of the output sensing signal VOS to be outputted to the controller 130.

In this way, when the anode of the diode constructed by the transistor T1 receives the input sensing signal VIS of the square-wave signal, the luminance sensing module 120a may be turned on according to the input sensing signal VIS to generate a turned-on bias voltage. Further, the light-sensitive transistor T2 receives the luminance intensity of the backlight panel in the display panel 110 and is turned on at this time, so that the turned-on bias voltage may generate the output sensing sub-signal VO1 through the turned-on light-sensitive transistor T2. Herein, a voltage drop on a turned-on resistance of the light-sensitive transistor T2 is determined by the luminance intensity of the backlight panel, and thereby, the voltage value of the output sensing sub-signal VO1 also changes according to the luminance intensity of the backlight panel.

For instance, when the luminance intensity of the backlight panel is relatively high, the voltage drop generated on the turned-on resistance of the turned-on light-sensitive transistor T2 is relatively low, so that the voltage value of the output sensing sub-signal VO1 is relatively high. Conversely, when the luminance intensity of the backlight panel is relatively low, the voltage drop on the turned-on resistance of the turned-on light-sensitive transistor T2 is relatively great, so that the voltage value of the output sensing sub-signal VO1 is relatively low. From another perspective, since an operation manner of the luminance sensing module 120b is similar to that of the luminance sensing module 120a, repeated description is not provided herein.

Accordingly, the light luminance sensing circuit 120 may generate the sensing voltage value of the output sensing signal VOS according to the output sensing sub-signals (e.g., the output sensing sub-signals VO1 and VO2). That is, in the invention, the luminance intensity of the backlight panel of the display panel 110 is instantaneously sensed through the light luminance sensing circuit 120, and the output sensing signal VOS generated corresponding to the luminance intensity of the backlight panel is provided to the controller 130.

Figure 3:
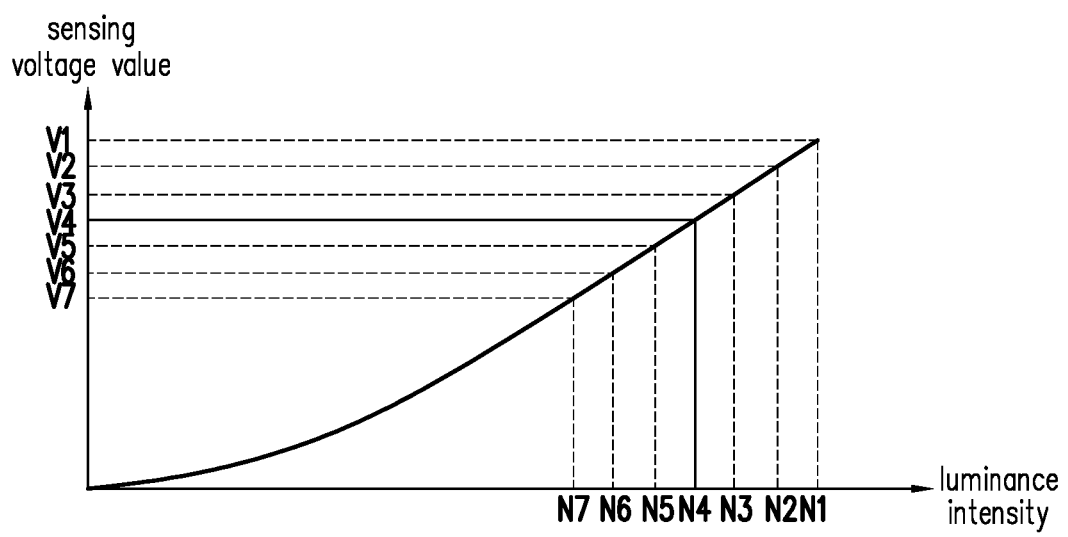
FIG. 3 is a schematic graph illustrating a corresponding relationship between the luminance intensity and the sensing voltage values of FIG. 1 according to an embodiment of the invention.

Next, with reference to FIG. 1 and FIG. 3 together, FIG. 3 is a schematic graph illustrating a corresponding relationship between the luminance intensity and the sensing voltage values of FIG. 1 according to an embodiment of the invention. In a curve graph of FIG. 3 provided by this embodiment, a vertical axis represents a plurality of sensing voltage values (e.g., sensing voltage values V1 to V7), and a horizontal axis represents luminance intensity corresponding to each of the sensing voltage values (e.g., luminance intensity N1 to N7). Herein, the sensing voltage values are V1>V2>V3>V4>V5>V6>V7, and the luminance intensity is N1>N2>N3>N4>N5>N6>N7. Note that in this embodiment, the tolerance of the luminance intensity N1 to N7 is, for example, 5%. For instance, if the luminance intensity N4 serves as the base, the luminance intensity N1 is equal to the luminance intensity N4 plus 15% of the luminance intensity N4, the luminance intensity N2 is equal to the luminance intensity N4 plus 10% of the luminance intensity N4, the luminance intensity N3 is equal to the luminance intensity N4 plus 5% of the luminance intensity N4, the luminance intensity N5 is equal to the luminance intensity N4 minus 5% of the luminance intensity N4, and the rest may be deduced by analogy. From another perspective, the corresponding relationship between the luminance intensity and the sensing voltage values depicted in FIG. 3 may be organized into a table as shown in Table 1.

TABLE 1

| luminance intensity corresponding to sensing voltage values | | | | | | | |
|---|---|---|---|---|---|---|---|
| luminance intensity | N7 | N6 | N5 | N4 | N3 | N2 | N1 |
| sensing voltage value | V7 | V6 | V5 | V4 | V3 | V2 | V1 |

Table 1 records the corresponding relation between the luminance intensity N1 to N7 and the sensing voltage values V1 to V7 organized in the curve graph of FIG. 3. Accordingly, the controller 130 of this invention may look up the luminance intensity corresponding to the sensing voltage value of the output sensing signal VOS sensed by the light luminance sensing circuit 120 according to Table 1. For instance, the corresponding luminance intensity looked up by the controller 130 according to Table 1 is N1 (i.e., equal to N4+15% of N4 nits) when the sensing voltage value of the output sensing signal VOS received by the controller 130 is equal to V1, the corresponding luminance intensity looked up by the controller 130 according to Table 1 is N2 (i.e., N4+10% of N4 nits) when the sensing voltage value of the output sensing signal VOS is equal to V2, the corresponding luminance intensity looked up by the controller 130 according to Table 1 is N3 (i.e., N4+5% of N4 nits) when the sensing voltage value of the output sensing signal VOS is equal to V3, and the rest may be deduced by analogy.

In addition, not that in order to simplify the description, only 7 sensing voltage values and the corresponding 7 luminance intensity are depicted in FIG. 3. Nevertheless, the invention is not intended to limit a number of the sensing voltage values, a number of the luminance intensity, and the tolerance of the luminance intensity in FIG. 3, and people having ordinary skill in the art may make adjustment according to actual applications.

Figure 4:
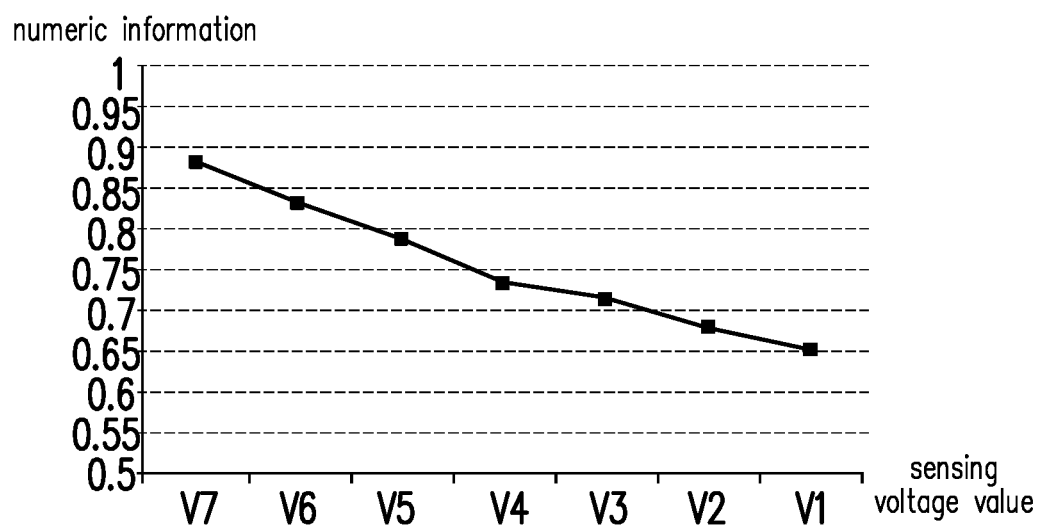
FIG. 4 is a schematic graph illustrating a corresponding relationship between the sensing voltage values and the numeric information of FIG. 1 according to an embodiment of the invention.

The operating method of converting the output sensing signal VOS to generate the selecting numeric information according to the look-up information after the controller 130 receives the output sensing signal VOS is described in detail next. With reference to FIG. 1 and FIG. 4 together, FIG. 4 is a schematic graph illustrating a corresponding relationship between the sensing voltage values of and the numeric information of FIG. 1 according to an embodiment of the invention. In this embodiment, the corresponding relationship between the electric characteristic values and the pieces of the numeric information is recorded in a curve graph depicted in FIG. 4, and the electric characteristic values are the sensing voltage values (e.g., the sensing voltage values V1 to V7). Specifically, in the curve graph of FIG. 4, a horizontal axis represents the sensing voltage values V1 to V7, and a vertical axis represents the numeric information corresponding to each of the sensing voltage values (e.g., the numeric information of 0.5 to 1). The corresponding relationship between the sensing voltage values V1 to V7 and the numeric information in the curve graph of FIG. 4 can be further organized into a table as shown in Table 2.

TABLE 2

| sensing voltage values corresponding to numeric information | | | | | | | |
|---|---|---|---|---|---|---|---|
| sensing voltage value | V7 | V6 | V5 | V4 | V3 | V2 | V1 |
| numeric information | 0.882 | 0.833 | 0.789 | 0.735 | 0.714 | 0.681 | 0.652 |

Table 2 records the corresponding data in detail between the sensing voltage values V1 to V7 and the numeric information organized from the curve graph of FIG. 4. Accordingly, the controller 130 of this invention may look up the numeric information corresponding to the sensing voltage value of the output sensing signal VOS sensed by the light luminance sensing circuit 120 according to the look-up information constituted by the curve graph in FIG. 4 and Table 2, so as to treat the numeric information as the selecting numeric information. For instance, the corresponding numeric information looked up by the controller 130 is 0.652 according to the look-up information and is treated as the selecting numeric information when the sensing voltage value of the output sensing signal VOS received by the controller 130 is equal to V1 at this time, the corresponding numeric information looked up by the controller 130 is 0.681 according to the look-up information and is treated as the selecting numeric information when the sensing voltage value of the output sensing signal VOS received by the controller 130 is equal to V2 at this time, the corresponding numeric information 0.714 is treated as the selecting numeric information when the sensing voltage value of the output sensing signal VOS received by the controller 130 is equal to V3 at this time, and the rest may be deduced by analogy.

Note that based on the corresponding relationship between the sensing voltage values V1 to V7 and the pieces of the numeric information organized in the look-up information, it can be seen that the sensing voltage values V1 to V7 are negatively correlated with the pieces of the numeric information, and the look-up information is recorded in the memory 150. In addition, note that the numbers and the tolerances of the sensing voltage values V1 to V7 and the corresponding pieces of the numeric information depicted in FIG. 4 act as exemplary examples only. Nevertheless, the invention is not intended to limit the number of the sensing voltage values, the number of the numeric information, and the tolerance of the numeric information, and people having ordinary skill in the art may make adjustment according to actual applications.

In this way, in the invention, the light luminance sensing circuit 120 can not only instantaneously sense the luminance intensity of the backlight panel of the display panel 110 to generate the output sensing signal VOS but also can look up the selecting numeric information corresponding to the luminance intensity of the backlight panel in the display panel 110 according to the sensing voltage value of the output sensing signal VOS and transmit the selecting numeric information to the controller 130. As such, the selecting numeric information is multiplied by a duty cycle of an original control driving signal by the controller 130 according to the selecting numeric information to generate the control driving signal DCS. Next, the luminance intensity of the backlight panel of the display panel 110 may thereby be adjusted through the driving circuit 140 according to the control driving signal DCS. In this way, the luminance intensity of the backlight panel is automatically adjusted, and that the luminance intensity of the backlight panel is maintained at expected target intensity.

Figure 5:
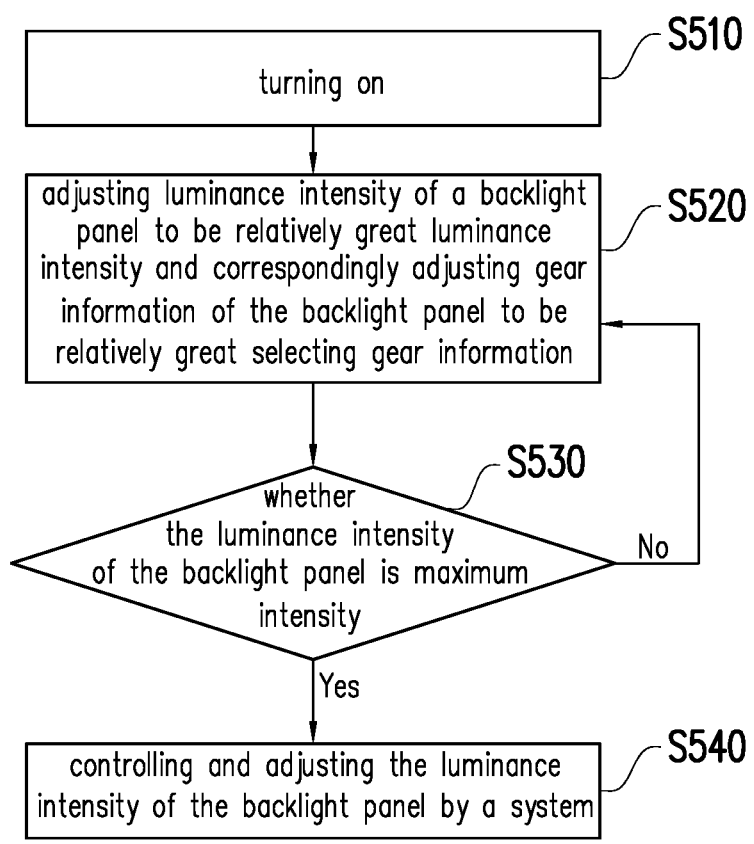
FIG. 5 is a flow chart illustrating automatic adjustment and calibration of luminance intensity according to an embodiment of the invention.

In addition, with reference to FIG. 1 and FIG. 5 together, an operational flow of automatically adjusting the luminance intensity of the backlight panel after the display apparatus 100 is turned on is described in FIG. 5 in detail, and FIG. 5 is a flow chart illustrating automatic adjustment and calibration of luminance intensity according to an embodiment of the invention. After the display apparatus 100 is turned on (i.e., step S510), in step S520, the controller 130 adjusts the luminance intensity of the backlight panel of the display panel 110 to be relatively great luminance intensity (i.e., the luminance intensity of the backlight panel is increased) and correspondingly adjusts the numeric information of the backlight panel to be relatively great selecting numeric information (i.e., selecting the correspondingly numeric information to act as the selecting numeric information according to the increased luminance intensity of the backlight panel).

Next, in step S530, the controller 130 determines the current luminance intensity of the backlight panel. If the luminance intensity of the backlight panel is determined to be maximum luminance intensity, the luminance intensity of the backlight panel at this time is fed back to a system, so as to control and adjust the luminance intensity of the backlight panel (i.e., step S540). Correspondingly, if the adjusted luminance intensity of the backlight panel is not the maximum luminance intensity, step S520 is performed again, so as to continuously adjusting the luminance intensity of the backlight panel and the corresponding numeric information. That is, in this embodiment, a loop of automatically adjusting and calibrating the luminance intensity of the backlight panel and the numeric information may be formed through step S520 and step S530, so as to continuously sensing and adjusting the luminance intensity of the backlight panel instantaneously to generate the luminance intensity of the backlight panel featuring a maximum intensity value.

Figure 6:
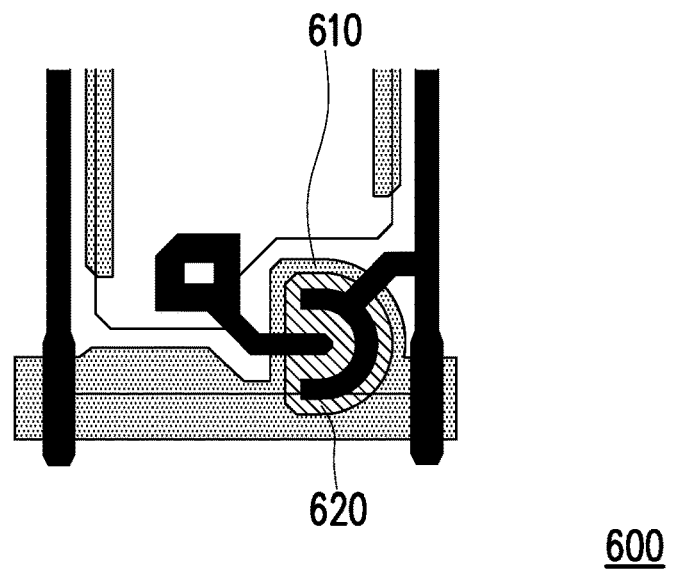
FIG. 6 is a top view illustrating a hardware architecture of the light-sensitive transistor of a display apparatus of FIG. 1 according to an embodiment of the invention.

With reference to FIG. 6, FIG. 6 is a top view illustrating a hardware architecture of a light-sensitive transistor of the display apparatus of FIG. 1 according to an embodiment of the invention. In this embodiment, in a display panel (e.g., the display panel 110 of FIG. 1), light-sensitive transistors (e.g., the light-sensitive transistors T2 and T4 in FIG. 2) included in a plurality of luminance sensing modules in a light luminance sensing circuit feature an island in structure. Specifically, an island in structure 600 has a gate layer 610 and a semiconductor layer 620 (i.e., amorphous silicon). The semiconductor layer 620 of this embodiment is disposed above the gate layer 610, and an area of the semiconductor layer 620 is less than an area of the gate layer 610. Specifically, since the area of the semiconductor layer 620 of this embodiment is relatively less, the semiconductor layer 620 may be shielded from light through the gate layer 610. Hence, an area of amorphous silicon exposed in light rays of the backlight panel is relatively reduced, and that a light leakage current is less likely to be generated. In this way, when the light luminance sensing circuit senses the luminance intensity of the backlight panel in this embodiment, interference generated by the light leakage current is reduced. Accordingly, a more accurate sensing voltage value of the output sensing signal can be generated, so that the sensing voltage value of the output sensing signal may be more accurately converted into the numeric information.

Figure 7:
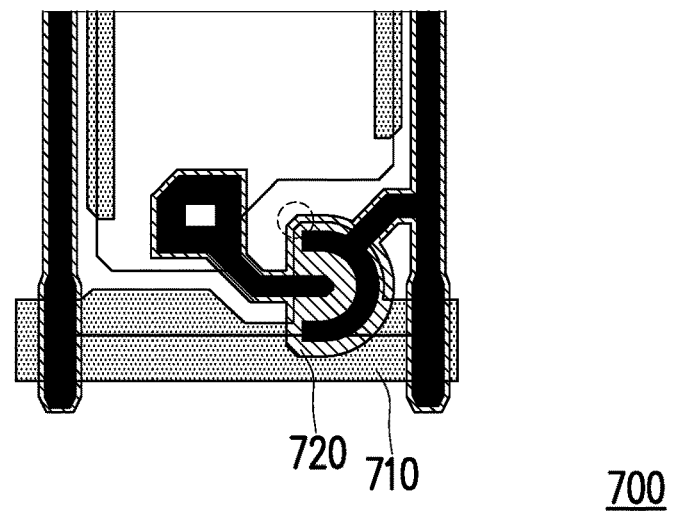
FIG. 7 is a top view illustrating a hardware architecture of a light-sensitive transistor of a display apparatus according to another embodiment of the invention.

In addition, with reference to FIG. 7, FIG. 7 is a top view illustrating a hardware architecture of a light-sensitive transistor of a display apparatus according to another embodiment of the invention. In this embodiment, light-sensitive transistors included in a plurality of luminance sensing modules of a light luminance sensing circuit in a display apparatus feature an island out structure. Specifically, an island out structure 700 has a gate layer 710 and a semiconductor layer 720. The semiconductor layer 720 is disposed above the gate layer 710, and a portion of an area of the semiconductor layer 720 exceeds an area of the gate layer 710 (e.g., the portion circled by the dotted line in FIG. 7). That is, in the island out structure 700 of the light-sensitive transistors of this embodiment, since the area of the semiconductor layer 720 is relatively great, portions of the semiconductor layer 720 are exposed around the gate layer 710 (e.g., the oblique line portion and the dotted line portion in FIG. 7). In this way, an area of amorphous silicon exposed in the light rays of the backlight panel is relatively great, so that the island out structure 700 is directly affected by the luminance intensity of the backlight panel, and that the light-sensitive transistors generate a relatively great light leakage current. That is, in the light luminance sensing circuit of this embodiment, the luminance intensity of the backlight panel may be instantaneously sensed, and the light leakage current generated corresponding to the luminance intensity of the backlight panel may act as the sensing current value of the output sensing signal to be sensed.

In addition, the light luminance sensing circuit transmits the output sensing signal generated by sensing the luminance intensity of the backlight panel to the controller. As such, the controller may look up the selecting numeric information corresponding to the sensing current value of the output sensing signal from the look-up information of which the corresponding relationship between the electric characteristic values and the pieces of the numeric information is recorded according to the received sensing current value of the output sensing signal. Herein, the electric characteristic values are the sensing current values, and the sensing current values are negatively correlated with the pieces of the numeric information. Accordingly, the control driving signal is generated according to the selecting numeric information, so that the driving circuit may adjust the luminance intensity of the backlight panel according to the control driving signal. In this way, the luminance intensity of the backlight panel is automatically adjusted and is maintained at the expected target intensity.

Figure 8:
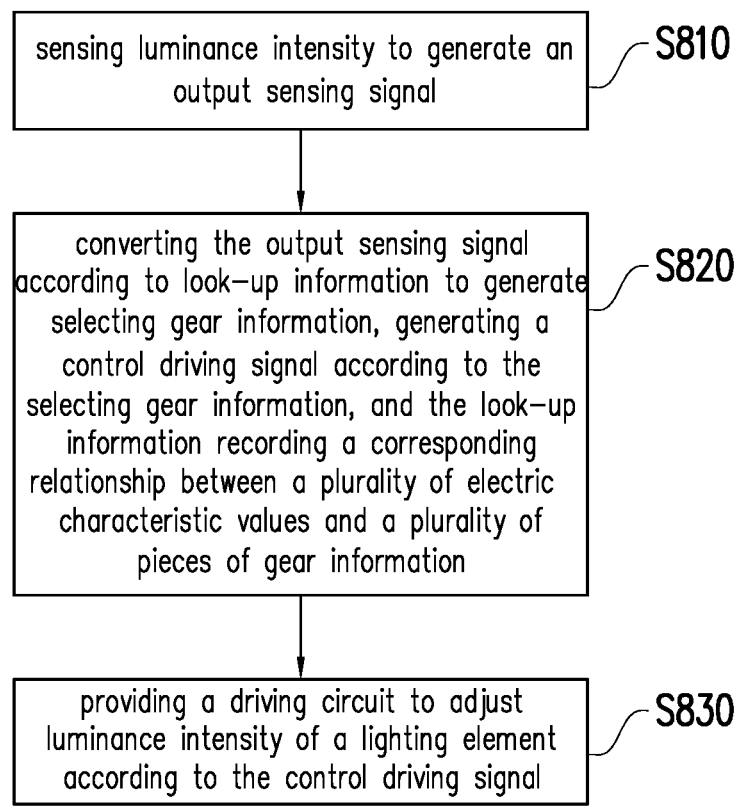
FIG. 8 is a flow chart illustrating an operating method of a display apparatus according to an embodiment of the invention.

With reference to FIG. 8, FIG. 8 is a flow chart illustrating an operating method of a display apparatus according to an embodiment of the invention. In step S810, luminance intensity is sensed first to generate an output sensing signal. In step S820, the output sensing signal is converted according to look-up information to generate selecting numeric information, and a control driving signal is further generated according to the selecting numeric information. Herein, the look-up information records a corresponding relationship between a plurality of electric characteristic values and a plurality of pieces of numeric information. Next, in step S820, a driving circuit is provided to adjust luminance intensity of a lighting element according to the control driving signal.

Note that implementation details of step S810 to step S830 are thoroughly described in the foregoing embodiments and examples and thus are not repeated hereinafter.

In view of the foregoing, in the embodiments of the invention, the luminance intensity of the backlight panel may be instantaneously sensed through the light luminance sensing circuit, and the output sensing signal is accordingly generated. Further, the output sensing signal is converted according to the look-up information through the controller to generate the selecting numeric information, and the control driving signal is generated according to the selecting numeric information, so as to adjust the luminance intensity of the backlight panel through the driving circuit. Therefore, the luminance intensity of the backlight panel is automatically adjusted, and the luminance intensity of the backlight panel is maintained at the expected target intensity.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A display apparatus, comprising:
a display panel;
a light luminance sensing circuit, disposed on the display panel, sensing luminance intensity to generate an output sensing signal, wherein the light luminance sensing circuit comprises:
a plurality of luminance sensing modules, each of the luminance sensing modules comprises:
a diode, an anode of the diode receiving an input sensing signal; and
a transistor, a first terminal of the transistor being coupled to a cathode of the diode, a control terminal of the transistor being coupled to a grounding voltage, a second terminal of the transistor generating an output sensing sub-signal, wherein a voltage value of the output sensing sub-signal changes according to the luminance intensity,
wherein the light luminance sensing circuit generates the output sensing signal according to the output sensing sub-signals of the luminance sensing modules;
a controller, coupled to the light luminance sensing circuit, receiving the output sensing signal, converting the output sensing signal to generate selecting numeric information according to look-up information, the controller generating a control driving signal according to the selecting numeric information, wherein the look-up information records a corresponding relationship between a plurality of electric characteristic values and a plurality of pieces of numeric information; and
a driving circuit, coupled to the controller, the driving circuit adjusting the luminance intensity of a lighting element according to the control driving signal.

2. The display apparatus as claimed in claim 1, wherein the display panel has an active region and a peripheral region, and the light luminance sensing circuit is disposed at the peripheral region of the display panel.

3. The display apparatus as claimed in claim 1, wherein the electric characteristic values are a plurality of sensing voltage values or a plurality of sensing current values.

4. The display apparatus as claimed in claim 1, wherein the look-up information is recorded in a memory, and the memory is coupled to the controller or is embedded in the controller.

5. The display apparatus as claimed in claim 1, wherein the electric characteristic values are negatively correlated with the pieces of the numeric information.

6. The display apparatus as claimed in claim 1, wherein the control driving signal is a pulse width modulation signal.

7. The display apparatus as claimed in claim 1, wherein the lighting element is a backlight panel.

8. An operating method of a display apparatus, comprising:
receiving an input sensing signal via a diode of a light luminance sensing circuit of the display apparatus;
sensing luminance intensity according to the input sensing signal, so as to generate an output sensing sub-signal via a transistor of the light luminance sensing circuit, wherein a first terminal of the transistor being coupled to a cathode of the diode, a control terminal of the transistor being coupled to a grounding voltage, and a voltage value of the output sensing sub-signal changes according to the luminance intensity;
generate the output sensing signal according to the output sensing sub-signal;
converting the output sensing signal to generate selecting numeric information according to look-up information, generating a control driving signal according to the selecting numeric information, wherein the look-up information records a corresponding relationship between a plurality of electric characteristic values and a plurality of pieces of numeric information; and
providing a driving circuit to adjust the luminance intensity of a lighting element according to the control driving signal.

9. The operating method as claimed in claim 8, wherein the electric characteristic values are a plurality of sensing voltage values or a plurality of sensing current values.

10. The operating method as claimed in claim 8, wherein the electric characteristic values are negatively correlated with the pieces of the numeric information.

11. The operating method as claimed in claim 8, wherein the control driving signal is a pulse width modulation signal.

* * * * *